(12) United States Patent
Schmitt

(10) Patent No.: US 6,460,647 B1
(45) Date of Patent: Oct. 8, 2002

(54) SLIP CONTROL SYSTEM

(75) Inventor: Johannes Schmitt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/708,849

(22) Filed: Nov. 8, 2000

(30) Foreign Application Priority Data

Nov. 11, 1999 (DE) .......................................... 199 54 282

(51) Int. Cl.$^7$ ................................................. B60K 3/00
(52) U.S. Cl. ............................. 180/197; 701/82; 701/90
(58) Field of Search ............................. 180/197, 82, 84, 180/85, 86, 338; 701/65, 53, 54, 69, 70, 71, 73, 74, 87, 90, 82, 67

(56) References Cited

U.S. PATENT DOCUMENTS

| 4,939,656 A | * | 7/1990 | Hoashi et al. | 364/426.02 |
| 4,944,358 A | * | 7/1990 | Wazaki et al. | 180/197 |
| 4,955,449 A | * | 9/1990 | Hilburger et al. | 180/197 |
| 5,113,963 A | * | 5/1992 | Sigl et al. | 180/197 |
| 5,117,934 A | * | 6/1992 | Tsuyama et al. | 180/197 |
| 5,183,128 A | * | 2/1993 | Ito et al. | 180/197 |
| 5,222,570 A | * | 6/1993 | Kawamura et al. | 180/197 |
| 5,263,548 A | * | 11/1993 | Tsuyama et al. | 180/197 |
| 5,357,788 A | | 10/1994 | Kantschar et al. | |
| 6,044,318 A | * | 3/2000 | Bourdon et al. | 701/65 |

FOREIGN PATENT DOCUMENTS

| DE | 195 49 083 | 7/1997 |
| EP | 386 126 | 9/1990 |

\* cited by examiner

Primary Examiner—Avraham Lerner
Assistant Examiner—Daniel Yeagley
(74) Attorney, Agent, or Firm—Kenyon & Kenyon

(57) ABSTRACT

A slip control system is described that, in response to unacceptable drive slip, reduces the torque of the drive unit of the vehicle. Upon recognition of driving over a rough section of road, the torque reduction is configured to be less and/or of shorter duration than is the case during normal operation.

8 Claims, 3 Drawing Sheets

SLIP CONTROL SYSTEM

FIELD OF THE INVENTION

The present invention relates to a slip control system, especially a traction control system, that reduces the torque of the drive unit of the vehicle when wheel slip becomes excessive at at least one driven wheel.

BACKGROUND INFORMATION

A traction control system is described in European Patent No. 386 126. According to this patent, the slip is determined at at least one driven wheel, and the engine torque is reduced as a function of this slip. If this driven wheel reverts to stable operation, i.e., there is no longer any unacceptable slip, the engine torque is slowly increased (ramp-up) by appropriate control of, for example, a throttle valve, according to a given function using variable parameters. This known method is problematic in that the traction control system is tuned for normal operation, especially with respect to the magnitude of the torque cutback and/or the steepness of the ramp-up. In special driving conditions, such as on rough sections of road, the traction control system tuned for normal operation demonstrates unsatisfactory dynamic characteristics in some application cases. In particular, deteriorated traction characteristics, which have a negative effect especially when the vehicle is to accelerate after or during driving over a rough section of road, occur as a result. Because the traction control system responds to rough sections of road when there are short-term wheel disturbances, the acceleration performance of the vehicle is impaired by the torque cutback and the slow ramp-up.

A comparable performance occurs in connection with an engine drag-torque control, in which there is an acceleration of the vehicle that is not desired by the driver during or after driving over a rough section of road. This is especially the case for a drag-torque control in which a controllable clutch is disengaged.

From the related art, there are various methods available for recognizing a rough section of road. For example, German Published Patent Application No. 42 15 938 (U.S. Pat. No. 5,357,788) describes the recognition of a rough section of road on the basis of the behavior of a wheel-speed signal. Described in German Published Patent Application No. 195 49 083 is a rough road recognition system based on an acceleration sensor, which is used, for example, in connection with restraint systems. In general, driving over rough sections of road causes wheel fluctuations, e.g., a fluctuation of the wheel speed above the slip threshold.

SUMMARY OF THE INVENTION

Due to the torque reduction being diminished or being of a shorter duration, especially due to the control of the magnitude of the torque reduction and/or the rapidity of the ramp-up, the traction of the vehicle on a rough section of road is substantially improved.

In particular, deteriorations in traction when there is a reacceleration after or while driving over a rough section of road, especially in a curve, are effectively prevented in this manner, since the effects of the traction control system on the traction of the vehicle are reduced.

The methods known in the related art are used in an especially beneficial manner for recognizing the rough section of road, so that the expense required to implement the described improvement is small.

Furthermore, the application of the aforementioned design approach is also beneficial when used in conjunction with engine drag-torque control systems (MSR), the increase in engine power being less and/or of shorter duration when a rough section of road is recognized, i.e., the cutback of the increase occurring more rapidly. In this way, unintended acceleration is prevented.

In a slip control system that disengages a controllable clutch in the deceleration operation in response to an incipient wheel lock or an incipient wheel spin at at least one driven wheel, the disengagement is completely or partially (setting a particular slip at the clutch) abandoned when a rough section of road has been recognized. This also improves the unsatisfactory performance of the vehicle in this situation.

DETAILED DESCRIPTION

Figure 1:
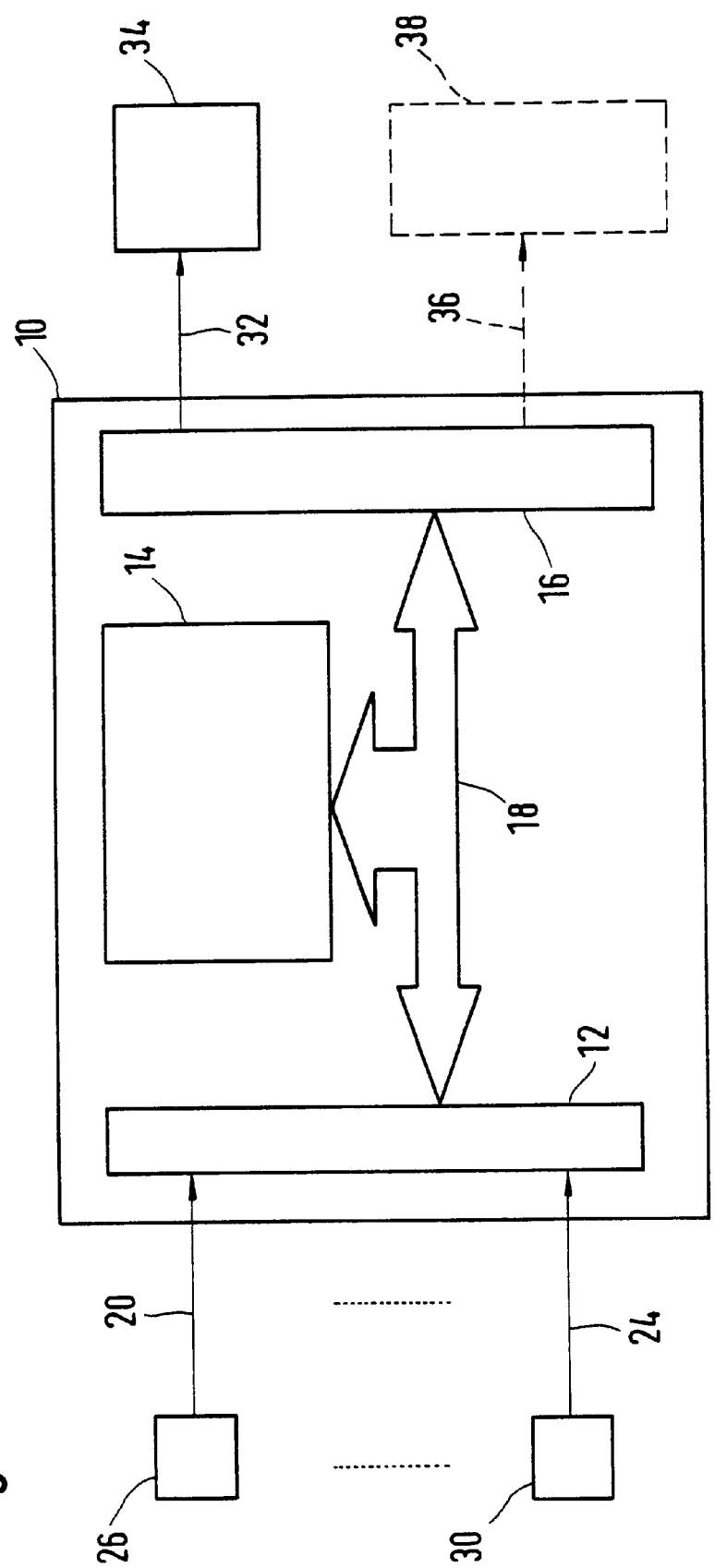
FIG. 1 shows a block diagram of a control device in which a traction control system is implemented.

FIG. 1 shows a control unit 10, which includes at least one input circuit 12, at least one computing element 14 and at least one output circuit 16. These elements are connected to each other by a communication system 18 for reciprocal exchange of data. Input lines carrying the signals, which represent performance quantities, or from which performance quantities can be derived, are supplied to input circuit 12. For reasons of clarity, only input lines 20 through 24, which supply signals representing the wheel speed, are shown in the exemplary embodiment depicted in FIG. 1. These signals are determined in measuring devices 26 through 30. In addition to these signals, additional variables are supplied—depending on the particular exemplary embodiment—such as the signal of an acceleration sensor, the rotational speed of the drive unit, the torque of the drive unit, etc. Within the context of the traction control performed by control unit 10, control unit 10 outputs manipulated variables via output circuit 16 and the output lines connected thereto. In this case, at least one output line 32 leads to at least one control element 34 for influencing the power or torque of the vehicle drive unit. This control element can be an engine control unit, to which a power or torque value is transmitted or, as in the preferred exemplary embodiment of an internal combustion engine, a throttle valve that is controlled by a corresponding manipulated variable via line 32. Furthermore, in other beneficial exemplary embodiments, as an alternative to or in addition to the engine intervention, braking system 38 of the vehicle is controlled via the at least one output line 36, braking force being built up at least one driven wheel when there is drive slip.

In another exemplary embodiment, the drive unit is not an internal combustion engine, but instead is a drive unit based on alternative drive concepts, e.g., at least one electric motor, so that the manipulated variable output over line 32 represents a manipulated variable for adjusting the torque of this drive motor.

The mode of operation of the traction control system is known in principle from the related art. As in the related art, the wheel slip of each driven wheel is determined on the basis of the wheel speed signal of the particular driven wheel and a reference variable, which, for example, is derived as a function of the wheel speed of at least one other wheel of the vehicle. This wheel slip value controls the reduction of the torque of the drive unit, either directly or upon exceeding a given threshold value, in order to reduce the wheel slip. In one embodiment, a reduction of the torque only takes place if an excessive wheel slip, i.e., an incipient wheel spin, of a driven wheel (instability) is recognized. The reduction of the torque is generally set up at the beginning of the wheel slip regulation as a stage, the torque being reduced to a value that is either predetermined or which is determined from a reduction torque that, in turn, is either a function of the slip or is a fixed, predetermined value. If the driven wheel in question has re-stabilized as a result of the torque reduction, that is, if the slip has been reduced, the torque is increased again according to a predetermined (time-dependent) function (ramp-up function) up to the level desired by the driver. The (average) slope of the torque increase, depending on the embodiment, is fixed in advance or is a function of factors such as slip, duration of slip, the number of adjustment cycles, the time-dependent integral with respect to slip, etc. These variables (magnitude of the torque rebound and/or the slope of the ramp-up) are tuned for the normal operating state on a solid, flat roadway.

Problems occur if multiple roadway disturbances are present, especially if the vehicle is on a bumpy road, for example a gravel road or a road having many potholes. Then, because of the wheel accelerations caused by the roadway disturbances, such a torque reduction occurs relatively frequently. This leads to a situation in which the torque desired by the driver, under certain circumstances, can only be reattained very hesitatingly. This has proven to be especially problematic for acceleration of the vehicle coming out of a curve if a traction control intervention occurred because of roadway disturbances while driving through the curve. Due to the hesitating resumption of the torque set by the driver, which is desired in an actual traction control situation, the dynamic response in an acceleration of the vehicle is substantially limited. This unsatisfactory handling, which ultimately does not permit the traction desired by the driver in the described driving situation, is countered in that driving over a rough section of road is recognized. This is achieved, for example, on the basis of at least one using the known methods. If a rough section of road has been recognized, the torque reduction is diminished and/or is executed for a shorter duration. In this way, despite the traction control intervention resulting from roadway disturbances, the desired traction is set immediately afterwards and the described disadvantages, especially when the vehicle is accelerating out of a curve, no longer occur or are so sharply reduced that the driver does not notice any unsatisfactory performance on the part of his vehicle.

The decrease and/or curtailment of the duration of the torque reduction is brought about, for example, in that the magnitude of the torque rebound and/or the slope of the ramp-up is affected by reducing the magnitude of the rebound and/or by increasing the slope of the ramp-up. Thus, for example, the variable that determines the torque reduction is decreased, or the torque value to which the torque is reduced is increased. The slope is increased in that the increase factor is augmented and/or the time span between two modified increase factors is decreased or the ramp-up is completely disabled. In a preferred exemplary embodiment, the slope in the ramp-up is a function of the number of adjustment cycles, of the time-dependent integral of the wheel slip and/or of the period for which the slip is unacceptable. Generally, the smaller the slope, the greater the number of cycles, the slip integral and/or the slip duration. In this exemplary embodiment, the number of adjustment cycles, or the integral of the unacceptable slip is set back when rough road is recognized, so that the low slope of the ramp-up in this case is abruptly switched to a very high slope.

A corresponding procedure is executed in connection with an engine drag-torque control in the reverse case when there is an incipient wheel lock of at least one driven wheel. In this case as well, an improvement in performance is achieved by a reduction of the torque increase and by acceleration of the ramp-down when rough road or fluctuation is recognized.

For systems that disengage a clutch when there is an incipient wheel spin or wheel lock, the disengagement of the clutch is prohibited or the disengaged clutch is engaged or controlled for slip if a rough section of road or a fluctuation has been recognized.

Figure 2:
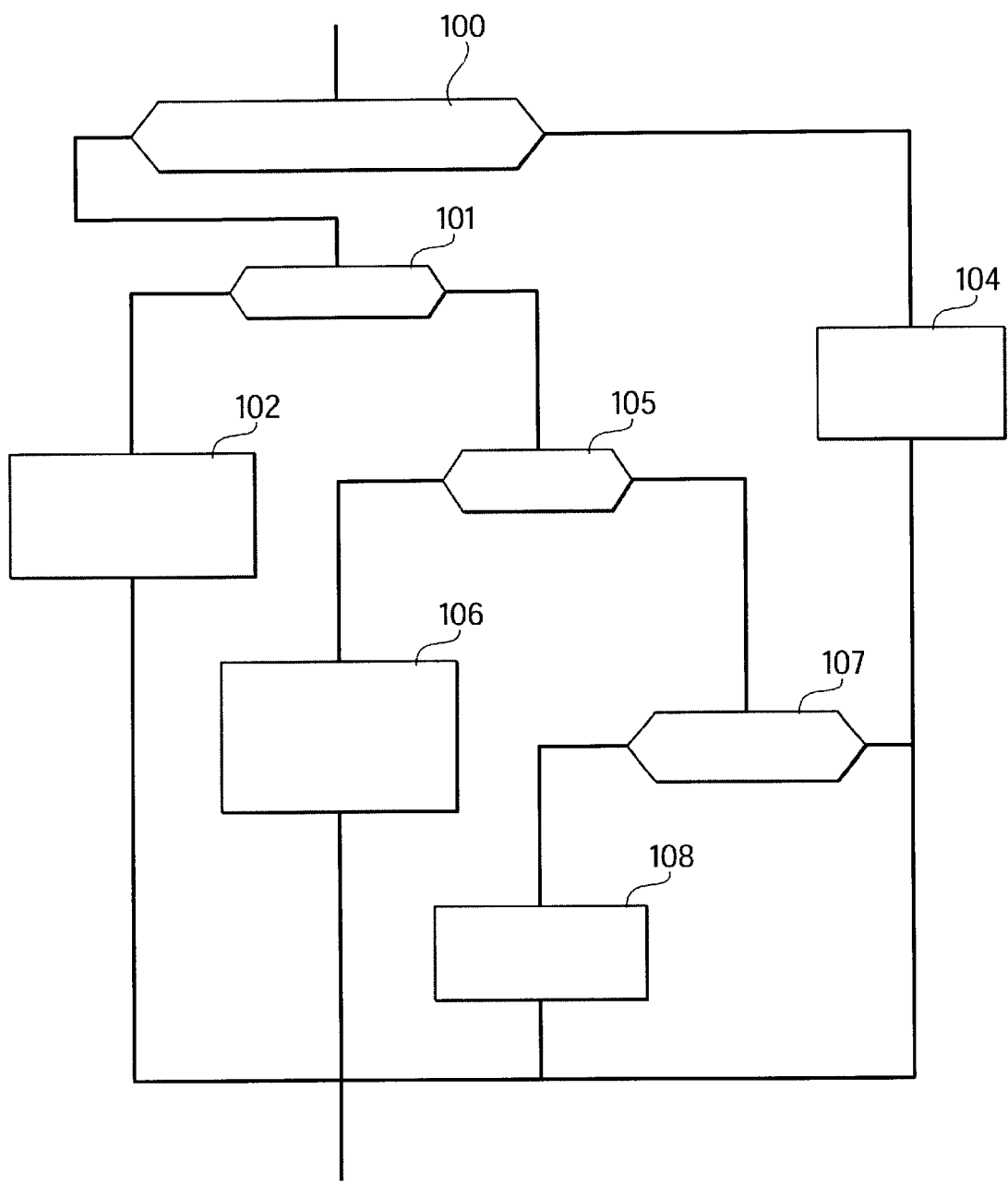
FIG. 2 shows a flow chart that sketches a preferred exemplary embodiment of the described design approach as a computer program.

In the preferred exemplary embodiment, the described design approach is implemented as a program of computer 14 of control unit 10. In FIG. 2, an example for a program of this type is depicted as a flow chart.

The program is run at predetermined instants, preferably during, in one beneficial exemplary embodiment, even while not actively engaged in traction control. First step 100 checks for a set flag to determine whether a rough section of road is being driven over. The recognition of such a rough section of road is accomplished using, for example, one of the known methods mentioned at the outset. If the flag is set, that is, a rough section of road is recognized, step 101 checks whether a traction control intervention will be performed or is presently active. If this is the case, step 102 sets the factors that are responsible for the magnitude of the torque reduction and/or the factors responsible for the slope of the subsequent ramp-up at values that generate a diminished reduction and/or a faster ramp-up. After that, the program is terminated and run anew at the next instant. If no traction control system (ASR) intervention is present, step 105 checks whether an engine drag-torque control (MSR) is pending or presently active. If this is the case, in step 106 the parameters for the magnitude of the engine torque increase are reduced and/or the parameters for the slope of the ramp-down of the torque increase are influenced so that the ramp-down occurs more rapidly. If it results from step 105 that no engine drag-torque control (MSR) is present, step 107 checks whether a clutch intervention is pending or is active. If this is the case, the clutch is engaged (step 108), even if an incipient wheel lock or wheel spin is indicated at a driven wheel. If there is no clutch intervention, the program is terminated and run anew at the next possible instant. If it results from step 100 that no rough section of road is present, then, according to step 104, the factors influenced in steps 102, 106, and/or 108 are kept at or returned to the values provided for normal operation. After step 104, the program is terminated and run anew at the next possible instant. The factors possibly modified in steps 102, 106 or 108 are evaluated when the regulation to which each pertains is carried out and lead to a diminished torque reduction and/or a shorter duration for the torque reduction in response to wheel slip than is the case in normal operation, or lead to a diminished torque increase and/or a shorter duration for the torque increase in response to brake slip than is the case in normal operation, or lead to an engagement of the clutch.

Figure 3A:
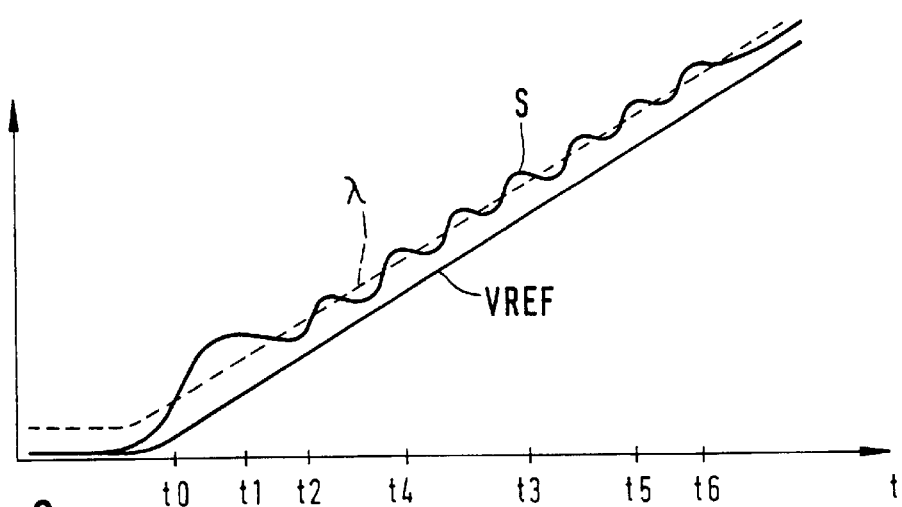
FIG. 3a shows a first timing diagram explaining the operation of the described design.
Figure 3B:
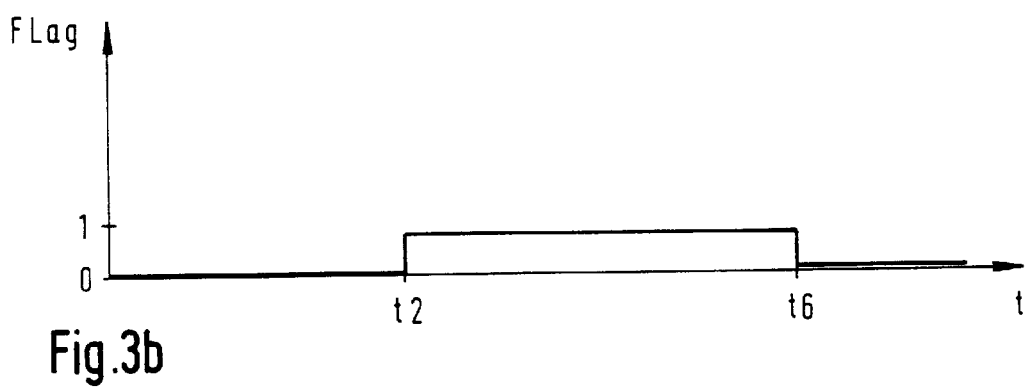
FIG. 3b shows a second timing diagram explaining the operation of the described design.
Figure 3C:
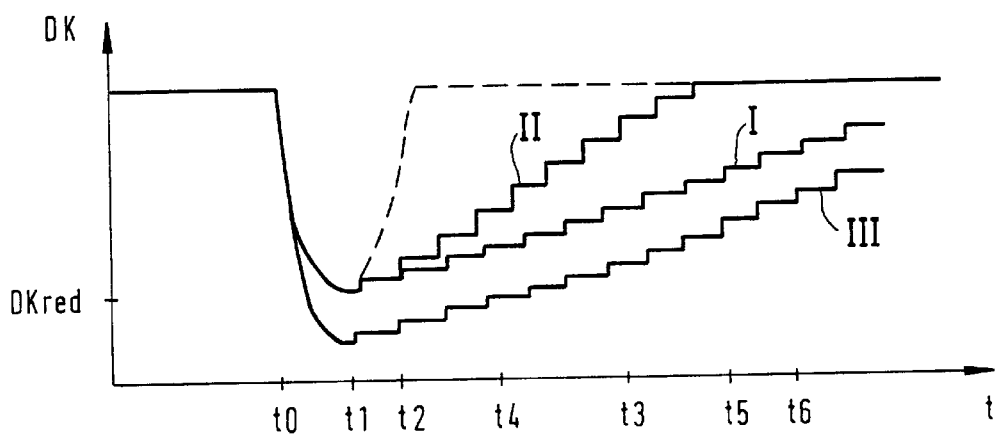
FIG. 3c shows a-third timing diagram explaining the operation of the described design.

Depicted in FIG. 3 are timing diagrams that further explain the effects of the procedure outlined above. In this context, FIG. 3a shows the time characteristic of reference speed VREF, slip threshold λ and wheel speed S, and FIG. 3b shows the characteristic of the flag for a rough section of road (fluctuation flag), while FIG. 3c depicts the time characteristic of throttle valve position DK, which essentially determines the torque of an internal combustion engine.

At time T0, the wheel speed of the driven wheel shown exceeds the slip threshold so that, according to FIG. 3c, the throttle valve angle is reduced to a predetermined value DKRED. At time T1, the wheel speed drops back below the slip threshold (see FIG. 3a). This leads to termination of the reduction of the throttle valve setting, and the throttle valve setting is, within the context of a ramp-up function, brought back up to the setting specified by the driver. In this regard, a first curve trace I, which corresponds to the ramp-up in normal operation, is depicted in FIG. 3c, while curve trace II depicts the ramp-up when a rough section of road is detected. At time T2, driving over a rough section of road is recognized and the flag is set according to FIG. 3b. This results in the ramp-up according to curve II occurring more rapidly. The fluctuation of the wheel speed around the slip threshold has no effect on the torque control due to the flag being set. At time T6, the flag is cleared and normal operation is resumed. An additional example is depicted in FIG. 3c using curve trace III. In this case, along with the slope of the ramp-up specified according to curve trace I, a clearer reduction of the throttle valve setting is executed to achieve a more optimal slip control during normal operation. In the preferred exemplary embodiment, the magnitude of the reduction is decreased in response to recognition of a rough section of road and/or (see curve trace II) the slope for the ramp-up is increased.

The procedure outlined above is used in connection with both gasoline and diesel internal combustion engines, but is also used in connection with alternative drive concepts, such as electric motors.

In the context described above, situations that, for other reasons, lead to a fluctuation of at least one wheel speed also are understood as falling under "rough section of road."

What is claimed is:

1. A slip control system comprising:
    an arrangement for providing a torque reduction with respect to a torque of a drive unit of a vehicle in response to an excessive slip of a driven wheel;
    an arrangement for increasing the torque to a value set by a driver after a stabilization of the driven wheel;
    an arrangement for recognizing a driving over a rough section of road; and
    an arrangement for configuring the torque reduction to be at least one of less in magnitude and of a shorter duration than is the case apart from the rough section of road, when driving over the rough section of road.

2. The slip control system according to claim 1, further comprising:
    an arrangement for influencing at least one of a magnitude of the torque reduction and a slope of restoring the torque.

3. The slip control system according to claim 1, further comprising:
    an arrangement for increasing a slope of a torque modification when being restored when driving over the rough section of road.

4. The slip control system according to claim 1, wherein:
    a slope of a torque addition is a function of a number of at least one of drive slip adjustment cycles, a duration of the slip, and a time-dependent integral with respect to the slip, and
    at least one of a slip duration factor, an adjustment cycle counter, and the time-dependent integral is set back when driving over the rough section of road.

5. The slip control system according to claim 1, wherein:
    a recognition of the rough section of road always occurs any time a fluctuation in a characteristic of a wheel speed of at least one wheel has been recognized.

6. A slip control system, comprising:
    an arrangement for increasing a torque of a vehicle drive unit when an incipient wheel lock at at least one driven wheel occurs;
    an arrangement for changing the torque to a value set by a driver after a stabilization of the at least one driven wheel;
    an arrangement for recognizing a driving over a rough section of road; and
    an arrangement for configuring an increase in the torque to be at least one of less in magnitude and of a shorter duration than is the case apart from the rough section of road when driving over the rough section of road.

7. A slip control system, comprising:
    an arrangement for disengaging a controllable clutch in a drive train of a vehicle when one of an incipient wheel lock and a wheel spin at at least one driven wheel occurs;
    an arrangement for re-engaging the controllable clutch after a stabilization of the at least one driven wheel; and
    an arrangement for recognizing a driving over a rough section of road, wherein:
    the controllable clutch is engaged when driving over the rough section of road.

8. The slip control system of claim 7, wherein:
    the controllable clutch is engaged when one of the incipient wheel lock and the wheel spin is recognized.

* * * * *